A. D. MANCHESTER.
Propagating Box.
No. 84,955.
Patented Dec. 15, 1868.
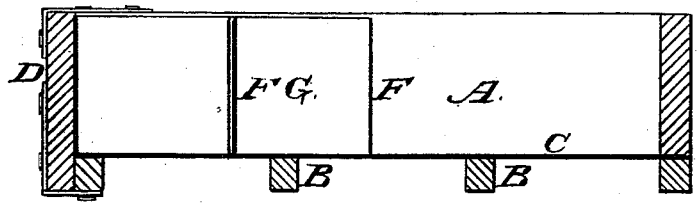
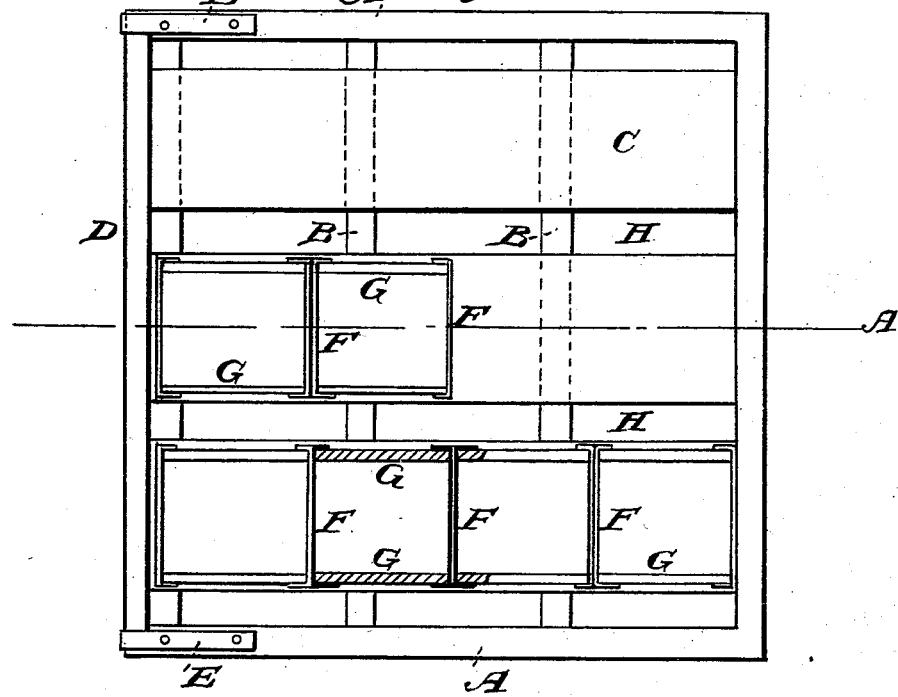
WITNESSES:
INVENTOR:
A. D. Manchester

ALBERT D. MANCHESTER, OF WESTPORT, MASSACHUSETTS.

Letters Patent No. 84,955, dated December 15, 1868.

---

IMPROVEMENT IN PROPAGATING-BOXES.

---

The Schedule referred to in these Letters Patent and making part of the same.

---

*To all whom it may concern:*

Be it known that I, ALBERT D. MANCHESTER, of Westport, in the county of Bristol, and State of Massachusetts, have invented a new and useful Improvement in Propagating-Boxes; and I do hereby declare that the following is a full, clear, and exact description thereof, which will enable those skilled in the art to make and use the same, reference being had to the accompanying drawings, forming part of this specification.

This invention relates to improvements in boxes or crates for propagating-purposes, the object of which is to provide boxes, of cheap construction, that will facilitate the same, and afford a ready means for removing them from the boxes without injuring the roots.

It consists in constructing the boxes of disconnected pieces, and so arranging them in a crate that fastenings are not required for maintaining them in the proper shape, the crate being arranged to facilitate the circulation of air.

Figure 1 represents a sectional elevation of my improvement, and

Figure 2 represents a plan view of the same.

Similar letters of reference indicate corresponding parts.

A represents the fixed sides of the crate, to which the cross-pieces B are secured, for supporting the metallic strips C.

D represents a detachable side of the crate, arranged to be readily attached to or detached from the fixed sides, and may be secured to them by metallic clips, E, fastened to one part, and hooked to the other part, or by other suitable means.

The boxes are composed of two plain sides, of wood or other material, G, and two sides, F, of sheet-metal, having the ends turned at right angles to lap around the ends of the plain sides G.

These boxes, so constructed, are arranged in rows on the metallic strips C, which form the bottoms, and they are of such sizes that a given number will form a continuous row across the crate, so that when the detachable side is placed in position and secured, they will be firmly supported together.

The said boxes may be filled with earth, and the seeds or plants placed therein, in the ordinary manner.

The spaces H afford a free circulation of air.

They may be put up in packages of any number of boxes, and of any size, and afford a very convenient means for removing the plants without injury to the roots, as, when the boxes are taken out of the crate, the sides will separate from the earth without disturbing the roots.

I claim as new, and desire to secure by Letters Patent—

1. The packing-box or crate A, constructed substantially as and for the purpose described.

2. The boxes F, constructed as described, and provided with the crate or box A, substantially as and for the purpose described.

Witnesses:   ALBERT D. MANCHESTER.
   ZEPHANIAH BORDEN,
   CHARLES R. BORDEN.